(12) United States Patent
Plattner et al.

(10) Patent No.: US 9,542,424 B2
(45) Date of Patent: Jan. 10, 2017

(54) LIFECYCLE-BASED HORIZONTAL PARTITIONING

(75) Inventors: Hasso Plattner, Schriesheim (DE); Martin Grund, Berlin (DE); Jens Krueger, Berlin (DE); Alexander Zeier, Berlin (DE)

(73) Assignee: Hasso-Plattner-Institut Fur Softwaresystemtechnik GmbH, Potsdam (DE)

( * ) Notice: Subject to any disclaimer, the term of this patent is extended or adjusted under 35 U.S.C. 154(b) by 53 days.

(21) Appl. No.: 12/827,972

(22) Filed: Jun. 30, 2010

(65) Prior Publication Data

US 2011/0161379 A1   Jun. 30, 2011

Related U.S. Application Data

(60) Provisional application No. 61/221,624, filed on Jun. 30, 2009, provisional application No. 61/333,803, filed on May 12, 2010.

(51) Int. Cl.
   *G06F 7/00*    (2006.01)
   *G06F 17/30*   (2006.01)

(52) U.S. Cl.
   CPC .............. *G06F 17/30312* (2013.01)

(58) Field of Classification Search
   None
   See application file for complete search history.

(56) References Cited

U.S. PATENT DOCUMENTS 5,644,766 A    7/1997  Coy et al.
6,330,572 B1   12/2001 Sitka
                       (Continued)

FOREIGN PATENT DOCUMENTS

EP    2040180 A1    3/2009
WO    2006089092 A2 8/2006
                       (Continued)

OTHER PUBLICATIONS

Mike Stonebraker et al., "C-Store: A Column-oriented DBMS," Proceedings of the 31st VLDB Conference, Noray, 2005.
(Continued)

*Primary Examiner* — Jau-Shya Meng
(74) *Attorney, Agent, or Firm* — Fountainhead Law Group P.C.

(57) ABSTRACT

The invention relates to a computer-implemented method for dynamically and horizontally partitioning a table of a relational database, wherein the table comprises records, wherein the records are mapped to a plurality of states, wherein the table is horizontally partitioned into a plurality of partitions, and wherein the plurality of states is mapped to the plurality of partitions. The method comprises the steps of changing the assignment of a first record from a first state to a second state, wherein the first state is mapped to a first partition, wherein the second state is mapped to a second partition, wherein the first partition is not the second partition, and storing the first record in the second partition. The invention further relates to a computer system implementing the abovementioned method for dynamically and horizontally partitioning a table of a relational database.

18 Claims, 8 Drawing Sheets

(56) References Cited

U.S. PATENT DOCUMENTS

| | | | |
|---|---|---|---|
| 6,343,299 B1* | 1/2002 | Huang | G06F 17/30578 707/638 |
| 6,405,198 B1* | 6/2002 | Bitar et al. | 707/999.003 |
| 6,615,365 B1* | 9/2003 | Jenevein et al. | 714/6.11 |
| 7,143,105 B2 | 11/2006 | Nakano et al. | 707/999.102 |
| 7,299,239 B1* | 11/2007 | Basu et al. | 707/999.002 |
| 7,868,789 B1* | 1/2011 | Binnig et al. | 341/51 |
| 8,078,646 B2* | 12/2011 | Das et al. | 707/802 |
| 2006/0206507 A1* | 9/2006 | Dahbour | 707/100 |
| 2007/0143564 A1* | 6/2007 | Uppala | G06F 17/30575 711/173 |
| 2007/0226177 A1* | 9/2007 | Barsness et al. | 707/2 |
| 2008/0320244 A1* | 12/2008 | Shen et al. | 711/153 |
| 2009/0019103 A1* | 1/2009 | Tommaney et al. | 709/201 |
| 2009/0089334 A1* | 4/2009 | Mohamed et al. | 707/200 |

FOREIGN PATENT DOCUMENTS

| | | |
|---|---|---|
| WO | 2006089092 A3 | 8/2006 |
| WO | 2009/009556 A1 | 1/2009 |
| WO | 2009037363 A1 | 3/2009 |

OTHER PUBLICATIONS

Jan Schaffner et al., "A Hybrid Row-Column OLTP Database Architecture for Operational Reporting," Business Intelligence for the Real-Time Enterprise: Second International Workshop, Birte 2008, Auckland, New Zealand. Aug. 24, 2008.

Sanjay Agrawal et al., "Integrating Vertical and Horizontal Partitioning into Automated Physical Database Design," SIGMOD 2004, Jun. 1, 2004.

Hasso Plattner, "A Common Database Approach for OLTP and OLAP Using an In-Memory Column Database," 35th SIGMOD International Conference on Management of Data, Jun. 29, 2009.

European Search Report (from a corresponding foreign application), mailed Oct. 8, 2010, European Application No. 10167994.2.

European Examination Report for European Patent Application No. 10167994.2 mailed Feb. 21, 2014.

* cited by examiner

Aging = Partitioning

Active

Trigger Events

Passive

- Each enterprise object has a dedicated lifecycle - modeled using a state-transition diagram

- Events determine the status of an object

- Map states to partitions

- Multiple partitions = parallel queries

SELECT c1,c4, c6 FROM table WHERE c4 < ?

LIFECYCLE-BASED HORIZONTAL PARTITIONING

CROSS REFERENCE TO RELATED APPLICATIONS

This application claims the benefit of U.S. Provisional Application No. 61/333,803, filed on May 12, 2010, entitled "Lifecycle-Based Horizontal Partitioning", and of U.S. Provisional Application No. 61/221,624, filed Jun. 30, 2009, entitled "Common Database Approach for OLTP and OLAP Using an In-Memory Column Database", which are incorporated herein by reference.

BACKGROUND

The present invention relates to a computer-implemented method for dynamically and horizontally partitioning a table of a relational database.

Unless otherwise indicated herein, the approaches described in this section are not prior art to the claims in this application and are not admitted to be prior art by inclusion in this section.

Relational database systems have been the backbone of business applications for more than 20 years. They promised to provide companies with a management information system covering the core applications, including financials, sales, order fulfillment, manufacturing, and human resources, which run from planning, through business processes, to individually defined analytics. However, this goal has not been achieved. The more complex business requirements became, the more the focus was put on the so-called transactional processing part and designed the database structures accordingly. These systems are called OLTP systems (Online Transactional Processing). Analytical and financial planning applications were increasingly moved out to separate systems for more flexibility and better performance. These systems are called OLAP systems (Online Analytical Processing). In reality, parts of the planning process were even moved off to specialized applications mainly around spreadsheets.

Both systems, OLTP and OLAP, are based on the relational theory but with different technical approaches [W. H. Inmon. Building the Data Warehouse, 3rd Edition. John Wiley & Sons, Inc., New York, N.Y., USA, 2002]. For OLTP systems, tuples are arranged in rows which are stored in blocks. The blocks reside on disk and are cached in main memory in the database server. Sophisticated indexing allows fast access to single tuples, however accesses get increasingly slower as the number of requested tuples increases. For OLAP systems on the other hand, data are often organized in star schemas, where a popular optimization is to compress attributes (columns) with the help of dictionaries. After the conversion of attributes into integers, processing becomes faster. More recently, the use of column store databases for analytics has become quite popular. Dictionary compression on the database level and reading only the columns necessary to process a query speed up query processing significantly in the column store case.

The introduction of so-called data warehouses must be considered to be a compromise. The flexibility and speed gained had to be paid for with additional management of the extraction and loading of data, and controlling of the redundancy. For many years, the discussion seemed to be closed and enterprise data was split into OLTP and OLAP [C. D. French. "One Size Fits All" Database Architectures Do Not Work for DDS. In Proceedings of the 1995 ACM SIGMOD International Conference on Management of Data, San Jose, Calif., May 22-25, 1995 [1], pages 449-450]. The OLTP is the necessary prerequisite for the OLAP. However only with the OLAP can companies understand their business and come to conclusions about how to steer and change course. When planned data and actual data are matched, business becomes transparent and decisions can be made. While centralized warehouses also handle the integration of data from many sources, it is still desirable to have OLTP and OLAP capabilities in one system which could make both components more valuable to their users.

The last 20 years, Moore's law enabled the enterprise system to grow both in functionality and volume [G. E. Moore. Cramming More Components Onto Integrated Circuits. Electronics, 38(8), 1965]. When the processor speed hit the 3 GHz level (2003) and further progress seemed to be distant, two developments helped out: unprecedented growth of main memory and massive parallelism through blade computing and multi-core CPUs [G. Koch. Discovering Multi-Core: Extending the Benefits of Moore's Law. Technology@Intel, (7), 2005]. While main memory was always welcome for e.g. caching and a large number of CPUs could be used for application servers, the databases for OLTP where not ideally suited for massive parallelism but stayed on SMP (symmetric multi processing) servers. The reasons were temporary locking of data storage segments for updates and the potential of deadlocks while updating multiple tables in parallel transactions. This is the main reason why for example R/3 from SAP ran all update transactions in a single thread and relied heavily on row level locking and super fast communication between parallel database processes (SMP). Some of the shortcomings could be overcome later by a better application design, but the separation of OLTP and OLAP remained unchallenged.

Early tests with in-memory databases of the relational type based on row storage did not show significant advantages over leading RDBMSs with equivalent memory for caching. Here the alternative idea to use column store databases for OLTP was born. Column storage was successfully used for many years in OLAP and really surged when main memory became abundant [M. Stonebraker, D. J. Abadi, A. Batkin, X. Chen, M. Cherniack, M. Ferreira, E. Lau, A. Lin, S. Madden, E. J. O'Neil, P. E. O'Neil, A. Rasin, N. Tran, and S. B. Zdonik. C-Store: A Column-oriented DBMS. In Proceedings of the 31st International Conference on Very Large Data Bases, Trondheim, Norway, Aug. 30-Sep. 2, 2005, pages 553-564. ACM, 2005] [P. Boncz. Monet: A Next-Generation DBMS Kernel for Query-Intensive Applications. 2002. PhD Thesis, Universiteit van Amsterdam, Amsterdam, The Netherlands].

SUMMARY

It is an object of the present invention to further improve operation and performance of databases.

This object is solved by the present invention by providing a computer-implemented method according to the independent claim 1 and the claims depending on claim 1 as well as a corresponding computer system according to claim 12.

In one embodiment of the computer-implemented method, a table of a relational database is dynamically and horizontally partitioned. The table comprises records, which are mapped to a plurality of states. The plurality of states is in turn mapped to the plurality of partitions. The table is horizontally partitioned into a plurality of partitions, wherein horizontally partitioned means that different records of the table are stored in different partitions of the table. The method comprises the step of changing the assignment of a first record from a first state to a second state, wherein the first record is mapped to a first partition, wherein the second record is mapped to a second partition, and wherein the first partition is not the second partition. The method further comprises the step of storing the first record in the second partition. The first record is anyone of the records, wherein the first state is anyone of the plurality of states, wherein the second state is anyone of the plurality of states, wherein the first partition is anyone of the plurality of partitions, and wherein the second partition is anyone of the plurality of partitions. The mapping of the records to a plurality of states is changed by changing the assignment of a first record from a first state to a second state.

According to the computer-implemented method, the records of the relational database are dynamically stored in a plurality of partitions according to the states of the records. The states are mapped to the plurality of partitions, such that every state is mapped to a partition. One, two or more states can be mapped to the same partition. When the assignment of the record is changed from the first state to the second state, wherein the first state is mapped to the first partition, and wherein the second state is mapped to the second partition, the record is automatically stored in the second partition.

The computer-implemented method for dynamically and horizontally partitioning a relational database is particular advantageous. Herein, records are dynamically stored in partitions according to their states. In practice, usage of records is often related to the states assigned to the records. Therefore, the partitions can be optimized according to the usage/states of the records that are being stored in them. Since the states of records may change from time to time, storing the records dynamically in partitions based on their states can improve the performance of the relational database significantly.

In another embodiment of the computer-implemented method, the step of storing the first record in the second partition occurs synchronously to the step of changing the assignment of the first record from the first state to the second state. According to the invention, this means one of the following: the step of storing occurs within the same database transaction as the step of changing, wherein a database transaction according to the invention is a sequence of operations performed on a record of the table, wherein the sequence of operations is considered to be an undividable unit, and wherein a database transaction may either be performed completely or not at all; the step of storing occurs immediately after the step of changing; the step of storing occurs at a predefined time after the step of changing.

In another embodiment of the computer-implemented method, the step of storing the first record in the second partition occurs asynchronously to the step of changing the assignment of the first record from the first state to the second state. According to the invention this means that the step of storing is not directly triggered by the step of changing the. The step of storing is triggered for instance by a predefined time, by a certain amount of times that the assignment of a record was changed (e.g. every 100 changed-state assignments all records with changed states are stored in their respective partitions) or by a low CPU usage of a computer system that the method is implemented on.

In another embodiment of the computer-implemented method, the computer-implemented method further comprises the step of removing the first record from the first partition. This embodiment of the computer-implemented method is associated with the advantage, that no redundant copies of a record are created.

In another embodiment of the computer-implemented method, the relational database comprises a plurality of operations, which can be performed on the records of the table. A first subset of the plurality of operations can be performed on records assigned to the first state and a second subset of the plurality of operations can be performed on records assigned to the second state, wherein the first subset is not identical to the second subset. Examples for operations according to the invention are the operations introduced by E. F. Codd: a union operator, a relational union operator, an intersection, a difference operator, a cartesian product, a selection, a projection operation a join operation, a relational division operation. Any other imaginable operations, which can be performed on relational database records, and any operations, which are implemented in relational databases such as SQL and others, are also examples for operations according to the invention.

In another embodiment of the computer-implemented method, the first partition resides on a first storage medium and the second partition resides on a second storage medium.

In another embodiment of the computer-implemented method, the first storage medium is faster than the second storage medium, and/or the first storage medium is more expensive than the second storage medium.

In another embodiment of the computer-implemented method, the first storage medium is DRAM memory.

In another embodiment of the computer-implemented method, the second storage medium is disk or flash memory.

In another embodiment of the computer-implemented method, the records may only be changed by an insert-only approach. There may be more than one version of the same record in an insert-only approach relational database. According to the invention, a record comprises all versions of itself. Therefore, in case a record is stored in a particular partition, all versions of this record are stored in that particular partition. In case a record is removed from a particular partition, all versions of this record are removed from that particular partition. In the following, the terms "record" and "tuple" are considered synonyms.

In another embodiment of the computer-implemented method, the table further comprises attributes. Further, the attributes comprise at least one state attribute. Each record comprises attribute values bijectively corresponding to the attributes. Each record comprises at least one state attribute value bijectively corresponding to the at least one state attribute. A state of a record depends on the at least one state attribute value.

In another embodiment of the computer-implemented method, the table is stored using column storage.

In another embodiment of the computer-implemented method, the table is stored using column storage, and each column containing the at least one state attribute is stored uncompressed.

The present invention also relates to a computer system that implements a computer program for horizontally partitioning a table of a relational database, wherein the table comprises records, wherein the records are mapped to a plurality of states, wherein the table is horizontally partitioned into a plurality of partitions, and wherein the plurality of states is mapped to the plurality of partitions. The computer program comprises a changing component for changing the assignment of a first record from a first state to a second state, wherein the first state is mapped to a first partition, wherein the second state is mapped to a second partition, wherein the first partition is not the second partition. The computer program further comprises a storing component for storing the first record in the second partition.

The following detailed description and accompanying drawings provide a better understanding of the nature and advantages of the present invention.

DETAILED DESCRIPTION

Described herein are techniques for dynamically and horizontally partitioning a table of a relational database. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A first embodiment of the computer-implemented method is shown in FIGS. 1 to 4, wherein a relational database is dynamically and horizontally partitioned.

The relational database is used to store business objects, which in the first embodiment are opportunity objects, wherein opportunity objects are also called enterprise objects. Each opportunity object has a dedicated lifecycle, which is modelled using a state-transition diagram shown in FIGS. 1 and 2. According to the state-transition diagram, each opportunity object occupies one of five states, which are: "open", "in-process", "stopped", "won" and "lost". Events change the state of an opportunity object, such that the opportunity object evolves according to the state-transition diagram shown in FIG. 1: The initial idea of an opportunity object is conceived; the opportunity object is opened and occupies the state "open". Eventually, the opportunity object is being processed and the state of the opportunity object changes to "in-process". From the state "in-process" the opportunity object can change into three different states: either the opportunity object is processed successfully and the state of the opportunity object changes to "won", or the opportunity object is processed unsuccessfully and the state of the opportunity object changes to "lost" or the opportunity object is abandoned in the course of processing and the state of the opportunity object changes to "stopped".

Figure 1:
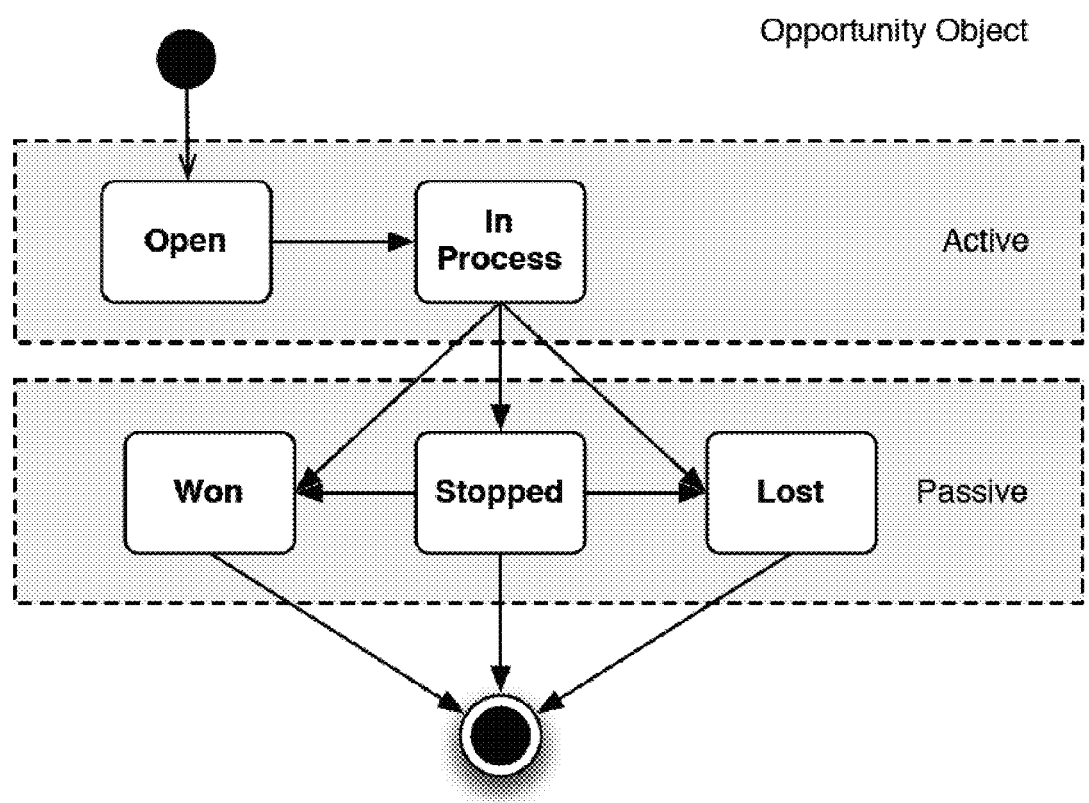
FIG. 1 illustrates a state-transition diagram of an opportunity (enterprise) object according to a first embodiment of the computer-implemented method.
Figure 2:
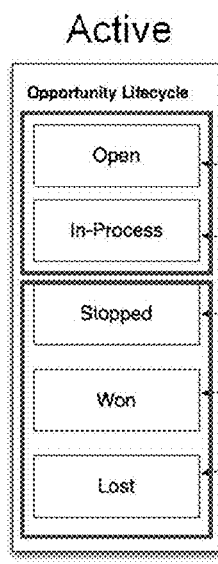
FIG. 2 illustrates the state-transition diagram of the opportunity (enterprise) object according to the first embodiment of the computer-implemented method.
Figure 3:
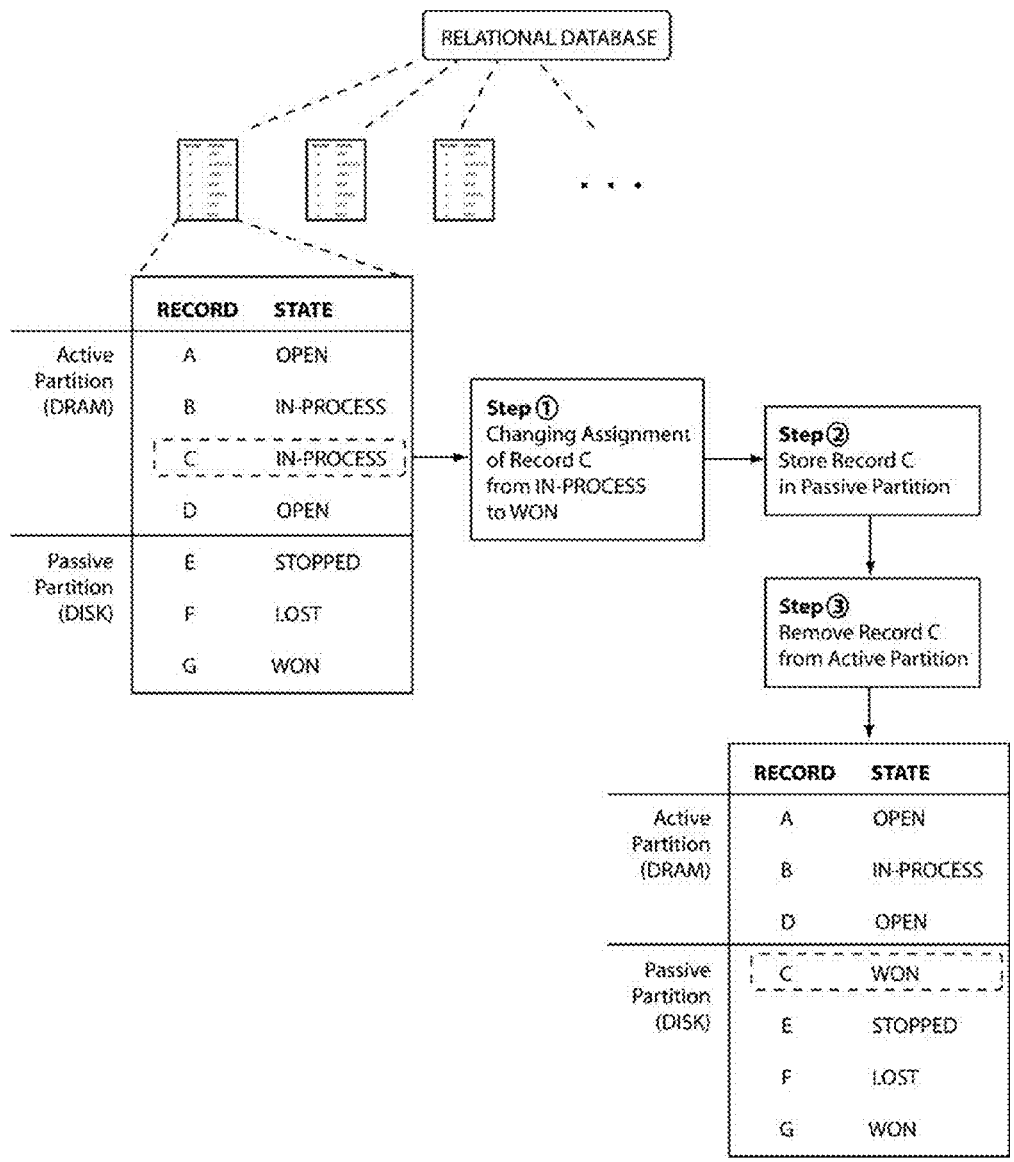
FIG. 3 illustrates the relational database, the table of the relational database storing records representing opportunity (enterprise) objects and the steps of the computer-implemented method of the first embodiment.
Figures 4, 5:
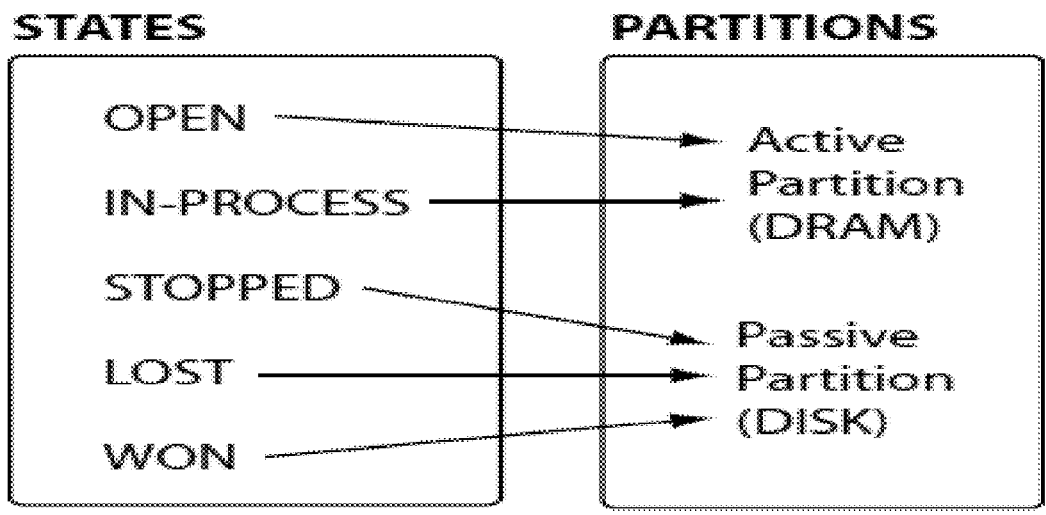
FIG. 4 illustrates the mapping of the states to partitions according to the first embodiment of the computer-implemented method.
FIG. 5 illustrates an example query and schema.

According to the first embodiment of the computer-implemented method, the opportunity objects are stored in a relational database as illustrated in FIG. 3 in order to archive, organize, plan, optimize and execute the opportunity objects. Thereby, the relational database comprises tables comprising records and attributes. In one of the tables, each opportunity object is represented as a record, wherein the record stores attribute values that characterize the corresponding opportunity object. In particular, the record stores the state of the opportunity object. As a result, every record representing an opportunity object is mapped to one of the five abovementioned states. The table is partitioned into two partitions—an active partition and a passive partition. The active partition resides on DRAM as storage medium and the passive partition resides on disk as storage medium, wherein DRAM is faster and more expensive than disk. The five states are in turn mapped to the two partitions according to FIG. 4. Explicitly, the states "open" and "in-process" are mapped to the active partition and the states "stopped", "lost" and "won" are mapped to the passive partition. FIG. 3 shows that all records representing an opportunity object are sorted according to their states: a record of an opportunity object occupying the state "open" is stored in the active partition (e.g. record A and record D); a record of an opportunity object occupying the state "in-process" is stored in the active partition (e.g. record B and record C); a record of an opportunity object occupying the state "stopped" is stored in the passive partition (e.g. record E); a record of an opportunity object occupying the state "won" is stored in the passive partition (e.g. record G); and a record of an opportunity object occupying the state "lost" is stored in the passive partition (e.g. record F).

In the first embodiment of the computer-implemented method, the computer-implemented method comprises the step of changing the assignment of a first record from a first state to a second state, wherein the first record is anyone of the records representing an opportunity object, wherein the first state is anyone of the five states, wherein the second state is anyone of the five states, wherein the first state is mapped to a first partition, wherein the second state is mapped to a second partition, wherein the first partition is anyone of the two partitions, wherein the second partition is anyone of the two partitions, and wherein the first partition is not the second partition. In the example illustrated by FIG. 3, this step is shown as "Step (1): Changing Assignment of Record C from IN-PROCESS to WON"—the state assigned to the opportunity object represented by the record C is changed from "in-process" to "won". Thereby, the record C corresponds to the first record. The state "in-process" corresponds to the first state. The state "won" corresponds to the second state. The active partition corresponds to the first partition. The passive partition corresponds to the second partition. The method further comprises the step of storing the first record in the second partition. In the example illustrated by FIG. 3, this step is shown as "Step (2): Store Record C in Passive Partition"—the record C is stored in the passive partition. The method further comprises the step of removing the first record from the first partition, which is shown by FIG. 3 as "Step (3): Remove Record C from Active Partition". The steps of storing the first record in the second partition and removing the first record from the first partition occur immediately after assigning the first record to the first state In the first embodiment of the computer-implemented method, the relational database comprises a plurality of operations, which can be performed on the records of the table. The state of a record determines which of the plurality of operations can be performed on the record. In the first embodiment of the computer-implemented method the records with the states "stopped", "lost" and "won" cannot be changed and/or updated. The records with the states "stopped", "lost" and "won" are stored read-only in the passive partition.

In the first embodiment of the computer-implemented method, the table is stored using column storage. The table comprises columns, wherein each column stores one attribute of the attributes of the table. One of the columns of the table stores an attribute called the state attribute, which contains the state information of the records. This column is stored uncompressed.

Advantages of Column Storage for Modern CPUS

Modern CPUs with multi-core architecture provide an enormous amount of computing power. Blades with 8 CPUs and 16 cores per CPU will populate next-generation blade servers providing 128 computing units with up to approximately 500 GB of main memory. To optimize the use of these computing devices one has to understand memory hierarchies, cache sizes and how to enable parallel processing within one program [P. A. Boncz, S. Manegold, and M. L. Kersten. Database Architecture Optimized for the New Bottleneck: Memory Access. In VLDB'99, Proceedings of 25th International Conference on Very Large Data Bases, Sep. 7-10, 1999, Edinburgh, Scotland, UK, pages 54-65. Morgan Kaufmann, 1999]. Considering the memory situation first, enterprise applications are to a large extent memory bound, that means the program execution time is proportional to the amount of memory accessed for read/write or being moved.

Figure 6:
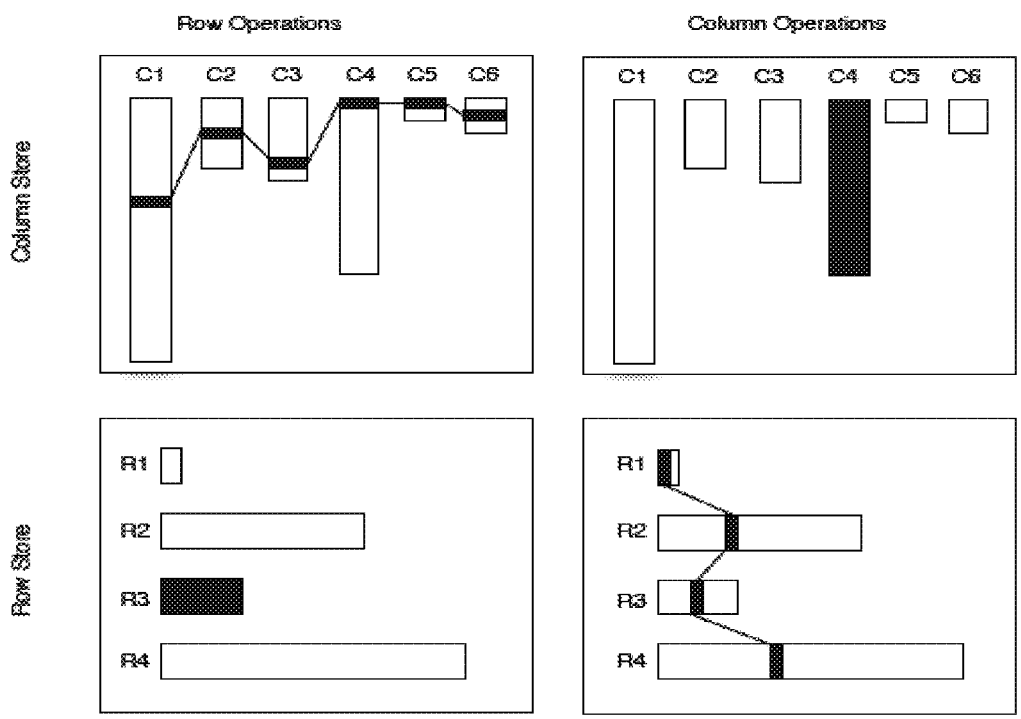
FIG. 6 illustrates data access in row and column storage.

As an example, a full table scan of SAP's accounting document line items table is considered, which has 160 attributes, in order to calculate a total value over all tuples. The inventors used the accounting data of a German brewery of 5 years, the number of tuples in this table was 34 million. In the underlying row database, 1 million tuples of this particular table consume about 1 GB of space. The size of the table was thus 35 GB. The equivalent column store table size was only 8 GB because of the more efficient vertical compression along columns. Considering that in real world applications only 10% of the attributes of a single table are typically used in one SQL-statement (see FIG. 5), that means for the column store at most 800 MB of data have to be accessed to calculate the total values [S. Aulbach, T. Grust, D. Jacobs, A. Kemper, and J. Rittinger. Multi-Tenant Databases for Software as s Service: Schema-Mapping Techniques. In Proceedings of the ACM SIGMOD International Conference on Management of Data, SIGMOD 2008, Vancouver, BC, Canada, Jun. 10-12, 2008, pages 1195-1206. ACM, 2008]. FIG. 6 shows (schematically) that the row storage with horizontal compression cannot compete, if processing is set-oriented and requires column operations. Even with the appropriate index the amount of data accessed is orders of magnitude higher.

According to the inventors' analyses of real systems with customer data, most applications in enterprise computing are actually based on set processing and not single tuple access. Thus, the benefit of having data arranged in a column store is substantial. In addition to this, most of the calculations can be executed on row level using the compressed, integer format. A performance gain of a factor 100-1000 in comparison to the same calculation executed on non-compressed data formats at the application level can be achieved. The application layer has to work with minimal projections in local SQL statements and avoid using more generic SQL statements in subroutines to support the reduction in memory access.

On top of these benefits comes the introduction of parallel processing. According to Hennessy in [J. L. Hennessy and D. A. Patterson. Computer Architecture—A Quantitative Approach. Morgan Kaufmann, fourth edition, 2007], the difficulty of creating parallel processing programs is to break up a program into equal-sized pieces, which then can be processed in parallel without much synchronization. The select operation through one or more columns is exactly what one is looking for. This operation can indeed be split easily into equal parts and distributed to multiple cores. The standard operations of OLAP engines and any other formal application logic e.g. calculation of due dates, currency conversion, working days for a given date interval etc. can be handled by stored procedures operating on the integer values of the compressed columns.

All calculations on the tuple level will automatically be parallelized, since they are completely independent of each other. The first level of an aggregation will be executed synchronously for each qualified tuple. The synchronization between the core processes is minimal. Further aggregation along given hierarchies take place as a second step on the accumulated data. The same applies to sorting by attributes or sequencing by time.

Even if only a few tuples qualify through the selected statement, the introduction of indices is not necessary because the scanning speed is so enormous, especially if parallel processing on multiple cores is active. On current CPUs, one can expect to process 1 MB per ms and with parallel processing on 16 cores>10 MB per ms. To put this into context, to look for a single dimension compressed in 4 bytes, one can scan 2.5 million tuples for qualification in 1 ms. With this speed in mind, it is not even necessary to provide a primary key index for most of the tables but the full column scan can be used instead. Column storage is so well suited for modern CPUs that the full scope of the relational algebra can be used without shortcomings in performance. It is important to note that every attribute now represents a potential index. There are no restrictions any more for the applications to focus on certain navigation paths. The delegation of most of the calculations to the database layer cleans up the application layer and leads to a better separation of concerns. This will result in a higher quality of programs and allow a better lifecycle with ongoing development. The hard disk is used only for transaction logging and snapshots for fast recovery. In fact, disk has become yesterday's tape [J. Gray. Tape is Dead. Disk is Tape. Flash is Disk, RAM Locality is King. Storage Guru Gong Show, Redmon, Wash., 2006].

Advantages of Column Storage for Update-Intensive Applications

Figure 7:
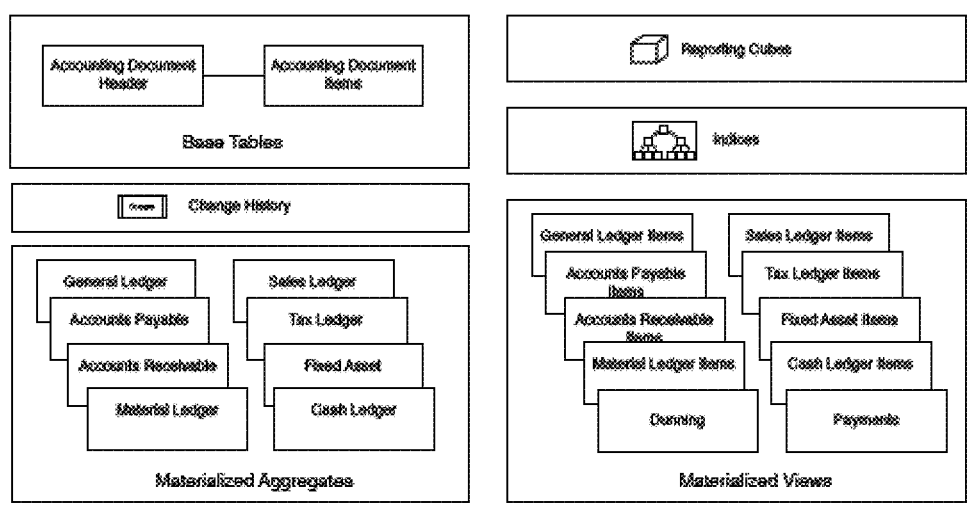
FIG. 7 illustrates a schema of a financial system.

Column store databases are said to be expensive to update [G. P. Copeland and S. Khoshafian. A Decomposition Storage Model. In Proceedings of the 1985 ACM SIGMOD International Conference on Management of Data, Austin, Tex., May 28-31, 1985, pages 268-279. ACM Press, 1985]. Having all data in main memory greatly improves the update performance of column stores, but the potential expansion of the attribute dictionaries must still be considered, which could lead to a situation where the compression has to be recalculated and thus affects the whole column. Therefore, the inventors analyzed the updates in a financial system (FIG. 7) in more detail.

History of SAP's Database Table Design

The large number of materialized views and materialized aggregates might be astonishing at first glance. This redundancy became necessary to achieve reasonable response times for displaying the line items. The higher number of inserts and the problematic update of redundant data using database triggers or procedural code was the price to pay. The customer-defined roll-ups into cubes in the OLAP part of the system allowed a flexible reporting at a reasonable response speed but added complexity and extra system management overhead.

Customer Data Analysis

In analyzing the change logs of 4 different SAP customers the inventors found that updates can be categorized into three major types:

Aggregate update: The attributes are accumulated values as part of materialized views (between 1 and 5 for each accounting line item)

State update: Binary change of a state variable, typically with time stamps

Value update: The value of an attribute changes by replacement

Aggregate Updates

Figure 8:
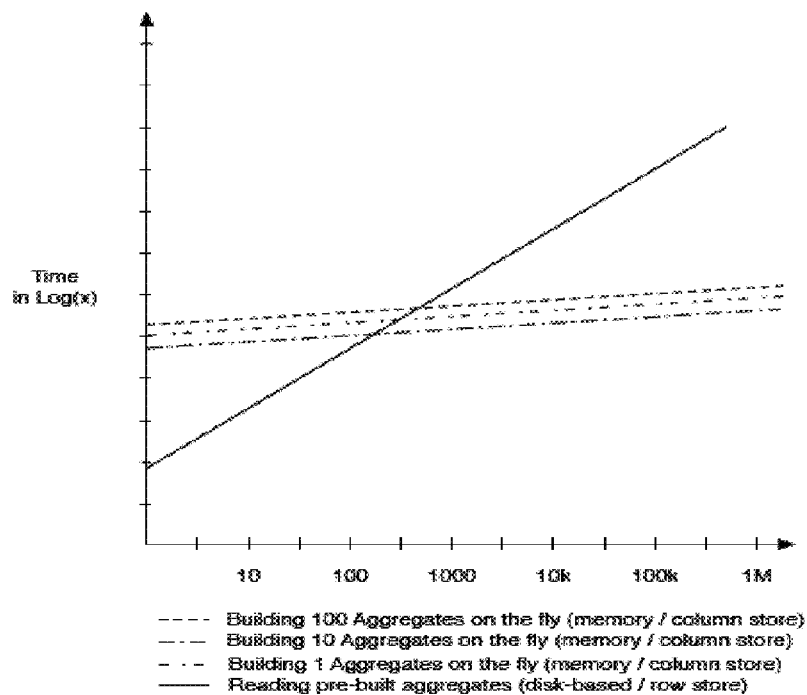
FIG. 8 illustrates a performance comparison of aggregation on the fly vs. Read of materialized views.

Most of the updates taking place in financial applications apply to total records following the structure of the coding block. The coding block can contain e.g. account number, legal organization, year, etc. These total records are basically materialized views on the journal entries in order to facilitate fast response time where aggregations are requested. Since the roll-ups into multi-dimensional cubes became obsolete when data warehouses based on column storage were introduced [J. Schaffner, A. Bog, J. Kruger, and A. Zeier. A Hybrid Row-Column OLTP Database Architecture for Operational Reporting. In Proceedings of the Second International Workshop on Business Intelligence for the Real-Time Enterprise, BIRTE 2008, in conjunction with VLDB'08, Aug. 24, 2008, Auckland, New Zealand, 2008] (see for example SAP Business Warehouse Explorer), the inventors analyzed whether aggregates could be created via algorithms and always on the fly. The more instances of aggregates are requested the better for the relative performance of the column storage (FIG. 8). The creation of aggregates corresponds to a full column scan, therefore the number of multiple aggregates in the response set has only little impact on the response time. In a record storage, the response time increases linearly with the number of aggregates read.

Status Updates

Status variables (e.g. to be paid, paid) typically use a predefined set of values and thus create no problem with an in-place update since the cardinality of the variable does not change. It is advisable that compression of sequences in the columns is not allowed. If the automatic recording of status changes is preferable for the application, the insert-only approach for these changes can also be used. In case the status variable has only two values, a null value and a time stamp are the best option. An in-place update is fully transparent even considering time-based queries.

Value Updates

Figure 9:
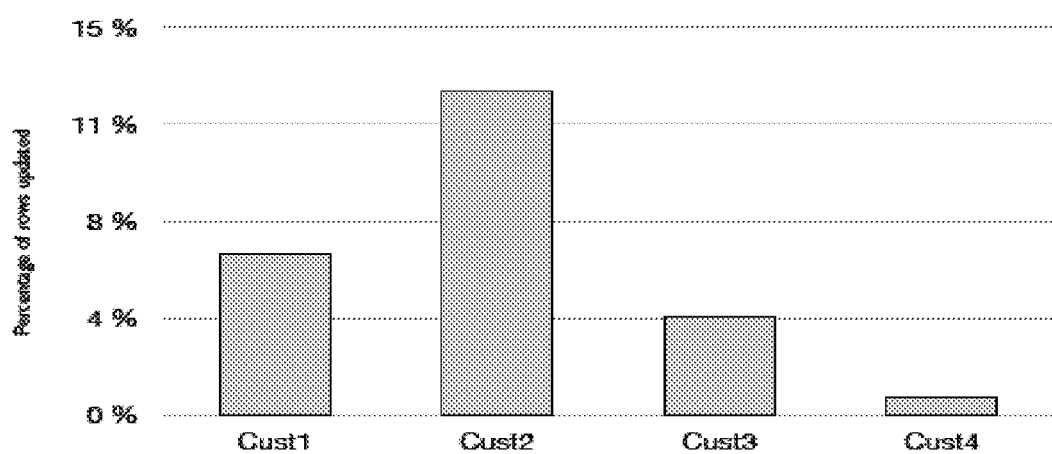
FIG. 9 illustrates update frequencies in financial accounting.

Since the change of an attribute in an enterprise application in most cases has to be recorded (log of changes), an insert-only approach seems to be the appropriate answer. FIG. 9 shows that only <5% of the tuples of a financial system will be changed over a long period of time. The extra load for the delta manager (the write-optimized store in a column store database which handles updates and inserts) and the extra consumption of main memory are acceptable. With the insert-only approach, nearly all attributes remain compressible and the change history is captured including time and origin of the change.

Despite the fact that typical enterprise systems are not really update-intensive, by using insert-only and by not maintaining totals, one can even reduce these updates. Since there are less updates, there are less locking issues and the tables can be more easily distributed (partitioned) horizontally across separate computing units (blades) with a shared nothing approach [M. Stonebraker. The Case for Shared Nothing. IEEE Database Engineering Bulletin, 9(1):4-9, 1986]. Having basically eliminated the updates only the inserts and the reads need to be considered.

Figure 10:
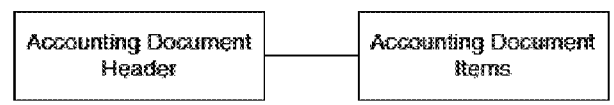
FIG. 10 illustrates a simplified financials system.

With these recommended changes to the financial system, the number of major tables will drop from more than 18 to 2 (not including change history, indices, and OLAP cubes), as depicted in FIG. 10. Only the accounting documents—header and line items—are kept in tables. The insert-only approach and calculation algorithms executed on the fly replace all indexes, materialized views and change history.

Advantages of the Insert-Only Approach

With the insert-only approach the update of tuples by the application could be eliminated with the exception of binary status variables. Having multiple versions of the same tuple in the database requires that the older ones be marked as currently not valid. Each inserted tuple carries the time stamp of its creation and in case it is being updated, the time stamp of the update. Only the latest version of a tuple carries no update time stamp and is therefore easily identifiable. The benefit of this concept is any state of the tuple can be recreated by using the two time stamps with regards to a base date for the query. This approach has been adopted before in POSTGRES [M. Stonebraker, L. A. Rowe, and M. Hirohama. The Implementation of Postgres. IEEE Transactions on Knowledge and Data Engineering, 2(1):125-142, 1990] in 1987 and was called "timetravel". The extended SQL has to support a base date parameter through which the valid version of a tuple can be identified.

To carry all older versions of a tuple in the same table has significant application advantages especially in planning applications, where retrieving older versions of data is common [S. Chaudhuri and U. Dayal. An Overview of Data Warehousing and OLAP Technology. SIGMOD Record, 26(1):65-74, 1997]. In addition to that it completely eliminates the necessity of creating a separate log of the changes. The additional storage capacity requirements can be ignored.

An update of a tuple results in an insert of the new version and an update of the last valid one. The time stamp attributes are not participating in any compression algorithm and therefore do not lead to any reorganization of the column when updated. Since multiple queries can coincide with inserts and updates, extreme care has to be taken to avoid too much locking on table-, column- or dictionary level.

Inserts are added to the delta store of the appropriate position of a table. The time stamp at the start of a query defines which tuples are valid (only tuples with a lower time stamp). In case an insert is in progress (single or multiple ones) the time stamp of the start of a new query will be set to the time stamp of the insert transaction minus one, and again the ongoing insert(s) will be ignored. This procedure is equivalent to snapshot isolation via time stamps [D.

Majumdar. A Quick Survey of MultiVersion Concurrency Algorithms, 2007. <simpledbm.googlecode.com/files/mvcc-survey-1.0.pdf>].

The logical update splits into an insert of the tuple with the new values and a notification of the old one that it is no longer valid. Again, the same time stamp logic applies and a costly locking mechanism can be avoided [H. Berenson, P. A. Bernstein, J. Gray, J. Melton, E. J. O'Neil, and P. E. O'Neil. A Critique of ANSI SQL Isolation Levels. In Proceedings of the 1995 ACM SIGMOD International Conference on Management of Data, San Jose, Calif., May 22-25, 1995 [1], pages 1-10]. Future research will specifically focus on concurrency and locking issues. As a general rule the data base system should perform each test with maximum speed, even occupying all resources (e.g. CPU cores) in order to reduce the potential for collisions and increasing management overhead.

Figure 11:
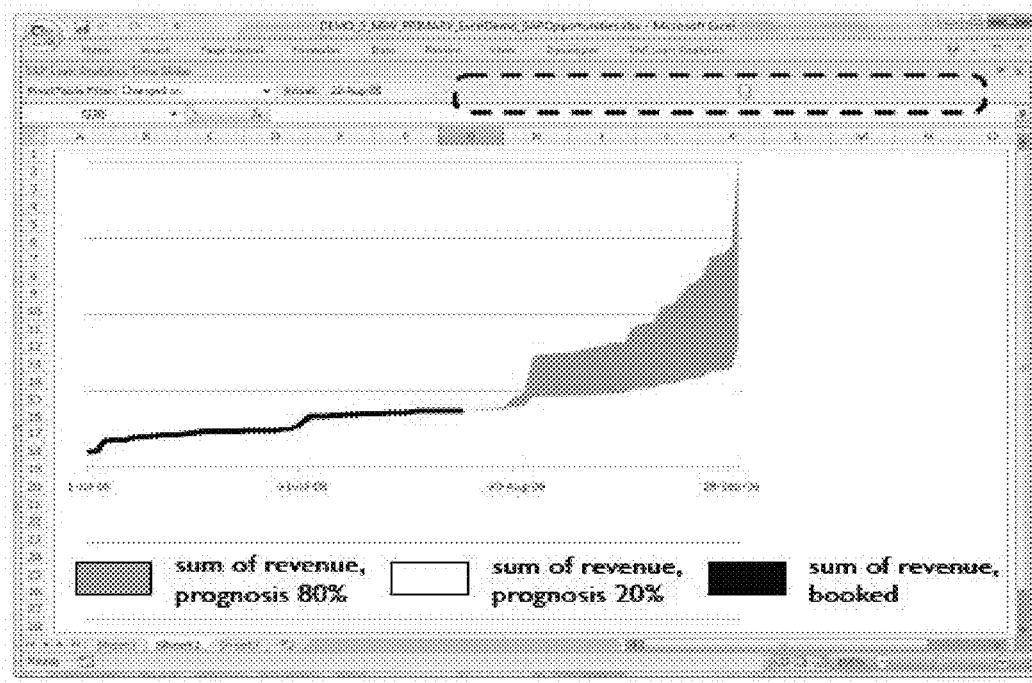
FIG. 11 illustrates a sales pipeline forecast using historical versions of the data.

Having the complete history of a tuple in the table allows the application to develop presentations of the evolution of facts over time. An example is the evolution of the sales forecast per day over a quarter in correlation with external events to better understand trends and improve the extrapolation (FIG. 11). Despite the application induces a full table scan for each incremental move of the slider (see dashed line), the user experience is similar to using a scroll-bar in Microsoft Word.

Advantages of Column Storage with Regards to Memory Consumption

Under the assumption to build a combined system for OLTP and OLAP data has to be organized for set processing, fast inserts, maximum (read) concurrency and low impact of reorganization. This imposes limits on the degree of compression for both row and column storage. While it is possible to achieve the same degree of compression in a row store as in a column store (see for e.g. IBM's Blink engine [V. Raman, G. Swart, L. Qiao, F. Reiss, V. Dialani, D. Kossmann, I. Narang, and R. Sidle. Constant-Time Query Processing. In Proceedings of the 24$^{th}$ International Conference on Data Engineering, ICDE 2008, Apr. 7-12, 2008, Cancún, México, pages 60-69. IEEE, 2008]), a comparison of the two should be done assuming that the requirements above (especially fast inserts) are met, which excludes read-only row stores from the discussion. Comparing the memory requirements of column and row storage of a table, the difference in compression rate is obvious. Various analyses of existing customer data show a typical compression rate of 20 for column store and a compression rate of 2 for (write-optimized) row storage on disk. For further memory consumption estimates a factor of 10 is used based on compression in favor of column storage. As discussed in another chapter, column storage allows to eliminate all materialized views (aggregates) and calculate them algorithmically on demand. The storage requirements associated with these aggregates vary from application to application. The multi-dimensional cubes typically used in OLAP systems for materialized roll-ups grow with the cardinality of the individual dimensions. Therefore a factor 2 in favor of column storage based on the elimination of redundant aggregates is a conservative estimate.

Horizontal partitioning of tables will be used based on time and tenants. The option to partition into multiple dimensions is very helpful in order to use different qualities of main memory and processor speed for specific dimensions. Within the context of memory consumption the option to split tables into current data and historic data per year is extremely interesting. The analysis of customer data showed that typically 5-10 years of historic data (no changes allowed) are kept in the operational database.

Historic data can be kept accessible but reside on a much cheaper and slower storage medium (flash memory or disk). The current data plus the last completed year should be kept in DRAM memory on blades for the typical year over year comparison in enterprise systems. For the separation by time two time stamps are used, creation time and completion time. The completion time is controlled by the application logic e.g. an order is completely processed or an invoice paid. The completion date determines the year in which data can become historic, that means no further changes are possible. With regards to main memory requirements a factor 5 in favor of column storage can be taken into into account. It is only fair to mention a horizontal partitioning could also be achieved in record storage. Should the remaining table size for the current and last years partition still be substantial, horizontal partitioning by the data base management may occur. Ignoring memory requirements for indices and dimension dictionaries, a 10×2×5 time reduction in storage capacity (from disk to main memory) can be assumed. Next generation boards for blade servers will most certainly provide roughly 500 GB of main memory with a tendency of further growth. Since arrays of 100 blades are already commercially available, installations with up to 50 TB for OLTP and OLAP could be converted to an in-memory-only system on DRAM. This covers the majority of e.g. SAP's Business Suite customers as far as storage capacity is concerned.

Advantages of Dynamical and Horizontal Partitioning

Business objects like customer orders, supplier orders, and accounting documents describe business transactions (not to be confused with database transactions). They are commonly referred to as transactional data and depending on the size of a company and the type of business the volume can reach from many millions up to billions of instances per year. Since they play a central role in most aspects of enterprise computing, extreme care should be taken about how to record, store and process them in enterprise systems. It is important to understand the specific nature of these business objects in order to find the optimum data organization and implement the best algorithms for the application methods. The following section describes how an enterprise system based on an in memory database using columnar storage can be optimized for speed and total cost of ownership.

The business objects are modeled in an object-oriented fashion and as the final step in the recording of a business transaction, the business object is handed over to the database for persistence in form of an XML document. Using the object schema the XML document will then be decomposed and each element of a node of the object instance will be stored as a tuple in a relational table. Each tuple will carry the unique object identification and the reference to the object node is defined by the mapping of nodes to tables. In literature, this is referred to as "shredding" of objects across relational tables.

With the help of the unique object identifier all elements of all nodes can be retrieved from the tables and an XML document as the representation of the business object recreated. In order to provide maximum speed for the complete retrieval of an object the tables representing the nodes will carry an index containing the unique object identifier. A skeleton of the XML document containing the unique object identifier plus for each instantiated node a node identifier will be stored as an object index and provides a direct reference to all tuples in all tables being instantiated by an object instance. Since all tables are organized as a column store, all attributes of all nodes can be used as an index to identify object instances. This allows for having extremely fast algorithms for processing sets of objects. Most business processes, especially the more computer-intensive ones, require for access to sets of objects e.g. all orders to be shipped today, all invoices due to be paid, all items of an account.

Since all data is kept in memory and the disk storage is used only for recovery the capacity for ten years of transactional data has to be provided. This is a legal requirement in most countries. In the past transactional data was kept in different form and different storage media (disk, tape) to cope with this requirement. For simplicity it is beneficial to keep all data using one schema only. All programs can access current and historic data in the same fashion. Database systems have been plagued in the past by the fact that three or more different means were used to store data. Disk storage was used for main persistence, main memory for caching and tape for archiving. They differ so fundamentally in speed and accessibility that the design of the database systems was severely compromised. Looking forward efforts are concentrated on in memory systems, with disk storage for backup and recovery. The higher price for DRAM storage forces one to consider carefully how to optimize memory consumption. A relational database using column store shows very promising aspects.

- The data compression using dictionary based conversion of attributes into integers is very efficient and fast.
- All attributes of a table can function as an index, since the scan of a column can be executed extremely fast on modern CPU's with multiple cores and two to three cache levels.
- As a result of the extreme speed when scanning columns and calculating totals on the fly, materialized aggregates become obsolete.
- Sequences of null values or column with null values only are compressed to a minimum.
- Once an insert only approach is applied, nearly no locking situations between inserts and selects will occur.

The same data organization will be used for both OLTP and OLAP.

That OLTP and OLAP applications access the same data is a huge advantage with regards to total cost of ownership (TCO), since no redundant data has to be managed and expensive ETL (extract, transform and load) processes can be completely avoided. The overall simplification of enterprise systems allows to adapt faster to new business requirements at substantially lower costs.

Despite the fact, that one has to keep business objects accessible for ten years one can distinguish between objects still active and objects which fulfill only legal or statistical purposes. Let's look at a customer order. After an order was created, manufacturing or collection from stock will take place, followed by shipment and invoicing. Once the warranty period is over no further activity can take place. The application has to manage these various states and for all transactional objects one knows the state "no longer active".

Companies think and report in periods like day, week, month, quarter, year, etc. In order to fulfill all regulatory reporting requirements only the current year, the last year and for comparisons the year before the last year have to be accessible. Any business transaction can only take place in the current year. Exceptions are rare and have to be handled separately.

It is obvious that a partitioning of the tables representing a transactional business object is advantageous. A table using column store consists of two components, the main store and the delta store. All inserts go first into the delta store as an append operation. The delta store is organized by columns and will be merged into the main store from time to time. For performance reasons a trade-off between a growing delta store and the cost of the merge of the delta store into the main store has to be considered. If the main store is partitioned into current, last year, last year −1, etc., then the delta store has to be merged only into the current partition of the main store.

The impact of this logic is huge. The current partition of a table contains at the beginning of a year only the objects which have been created earlier and are still active. All objects created during the current year will also be stored in this partition. Objects which are completely processed during the current year still belong to the current year partition but will not be carried forward at the end of the year into the following year.

Applications working on active data have to access the current year partition of the main store and the corresponding delta store only.

Applications working on last year's data have to access the last year partition of the main store and all of the above.

Applications working on previous to last year's data have to access the previous to last year's partition and all of the above.

Etc.

This organization avoids redundancy in data and optimizes the access to recent data. The applications only have to provide a base period defining the business year(s) it wants to work on. Together with the insert only approach this provides a very simple method to manage history e.g. recreating data constellations as they occurred at a certain date in the past, using the time stamp logic.

All this means the size of the current year partition is at most 1/10 of the total size of a table, plus the number of objects which were still active at the beginning of the year. This number depends on the type of business, for retailers the percentage is relatively low (10% of the volume of a year), for manufacturing to order companies the percentage is higher (50-100% of the volume of a year). Under these assumptions the partition for the main store varies between 0.11 T and 0.2 T where T is the total number of tuples in a table representing a node of a transactional business object.

Since all find operations, all aggregations, all join operations and as already mentioned the merge of the delta store, are directly proportional to the size of the current partition of the main store as far as time is concerned, a substantial performance improvement without losing any flexibility retrieving data from partitions other than the current year can be achieved.

Most activities in a company will access data from the current year partitions. As mentioned earlier reporting will access last year's partition and—for comparisons—last year −1's partition. The other partitions might be accessed for compliance, fraud detection legal investigations and other rare activities.

How to map the time based partitions of tables to hardware instances is part of an overall optimization process. All partitions but the current year one are read only and can therefore be implemented as write once, read often type of storage.

The TCO of such an approach is not only impacted by shorter database response time and a mere sophisticated storage selection but also by the fact that only data schema is used for all applications including the data reorganization programs.

Advantages for Typical Data-Entry Transactions?

Data entry transactions consist of three parts: user data entry, data validation and database update. Most of the data validation remains unchanged. Only the fact that any attribute of a table operates as an index can help to improve the quality of validation, e.g. in checking for duplicates of customer-, supplier-, parts-entries or incoming invoices. The database update is reduced to a mere insert. No indices (primary and secondary ones) need to be maintained and for journal entries, customer orders, stock movements etc no update of aggregations takes place. As a result, the throughput of transactional data entry will improve. The delta manager handles the initial insert of new tuples.

The delta storage is again organized as a column storage. Since data retrieval and inserts can influence each other, extreme care has to be taken in the implementation to avoid unnecessary locking This is particularly true with inserts in partitioned tables. In order to reduce the influence of inserts on dictionary tables and reduce the impact of merge operation between delta storage and main storage a two tier organization of the delta storage is a concept currently investigated. The focus of research and development shifts consequently from maximum compression of data to high speed insert with minimum effect of queries.

Advantages for Application Development

Applications based on a relational database using column storage should use the relational algebra and the extended SQL-features to delegate as much of the logic to the data base level and the stored procedures. In rewriting existing applications a reduction of the amount of code by more than 30% (in more formal applications like financials 40-50%) can be expected. Many parts can be completely restructured using the fully-indexed nature of column storage. In an ideal situation the application sets only the parameter for an algorithm completely defined by SQL (extended) and executed on database level. The application then works on the result set to produce the output (screen, e-mail, print, phone, etc.). As mentioned before, the strict use of minimal views is recommended. The high performance of the data base makes caching of data on the application level largely superfluous.

The option to partition tables in multiple dimensions (time, tenant, primary key range, etc) helps to achieve minimum response times for even larger tables. Since columns which have not yet been populated do not take any space in storage, except a 100 bytes stub, the addition of new columns to an existing table is simple.

To verify the inventors' findings a next generation accounting system for accounts receivable, accounts payable, general ledger and cost accounting including planning has been set up. The basis is SAP's on demand system ByDesign. All user interaction, configuration etc. remain identical to enable a complete parallel test.

The table for the journal entries has only one index, the accounting document number (plus line item number). There are no indices to connect the journal entries with the accounts (debitor, creditor, G/L or cost center etc.). The only attributes updated in place are: creation-, invalidation- and reconciliation time stamp. All other changes result in an insert of the changed entry and the invalidation of the old one.

There are no aggregates in form of materialized views; they will instead be created via algorithms on the fly. The data entry speed improves since only two tables (document header, document line item alias journal entry) receive inserts. The simplicity of the transaction allows reconsidering a forward recovery approach instead of backing out a failed transaction.

Every presentation of accounting data can be defined as a spreadsheet, identifying the account(s), their hierarchical structuring (sets), the values to be calculated (aggregates). After a translation into extended SQL, the statement can be verified for correction and assuming the SQL processor works flawlessly no further testing is required. The application can fully concentrate on user interaction and information presentation.

Not only have redundant tables been eliminated, but their maintenance in form of update procedures or the ETL process between the OLTP and OLAP parts of a system.

Advantages of Column Storage in SAAS Applications

In SaaS (Software as a Service) applications several aspects of column storage are helpful. Columns which are unused are only represented by a stub. The introduction of a new attribute to a table means an update of the metadata and the creation of a stub for the column [S. Aulbach, T. Grust, D. Jacobs, A. Kemper, and J. Rittinger. Multi-Tenant Databases for Software as s Service: Schema-Mapping Techniques. In Proceedings of the ACM SIGMOD International Conference on Management of Data, SIGMOD 2008, Vancouver, BC, Canada, Jun. 10-12, 2008, pages 1195-1206. ACM, 2008]. The attributes can from then on be used by the application. This is an important feature for the ongoing development of the application without any interruption for the user. The join with external data, which after import to the host system is held in column storage, is extremely efficient even for very large tables (minimum main memory accessed) the integration which after applications happens via the service layer (predefined) are SQL. In both cases the greatly improved response time will be appreciated.

Not only can the application now determine what base date for a query should be chosen but the development of the content (attributes) of individual tuples can be monitored (e.g. lifecycle of a customer order, control of sensitive data in human resources or accounts payable).

Figure 12:
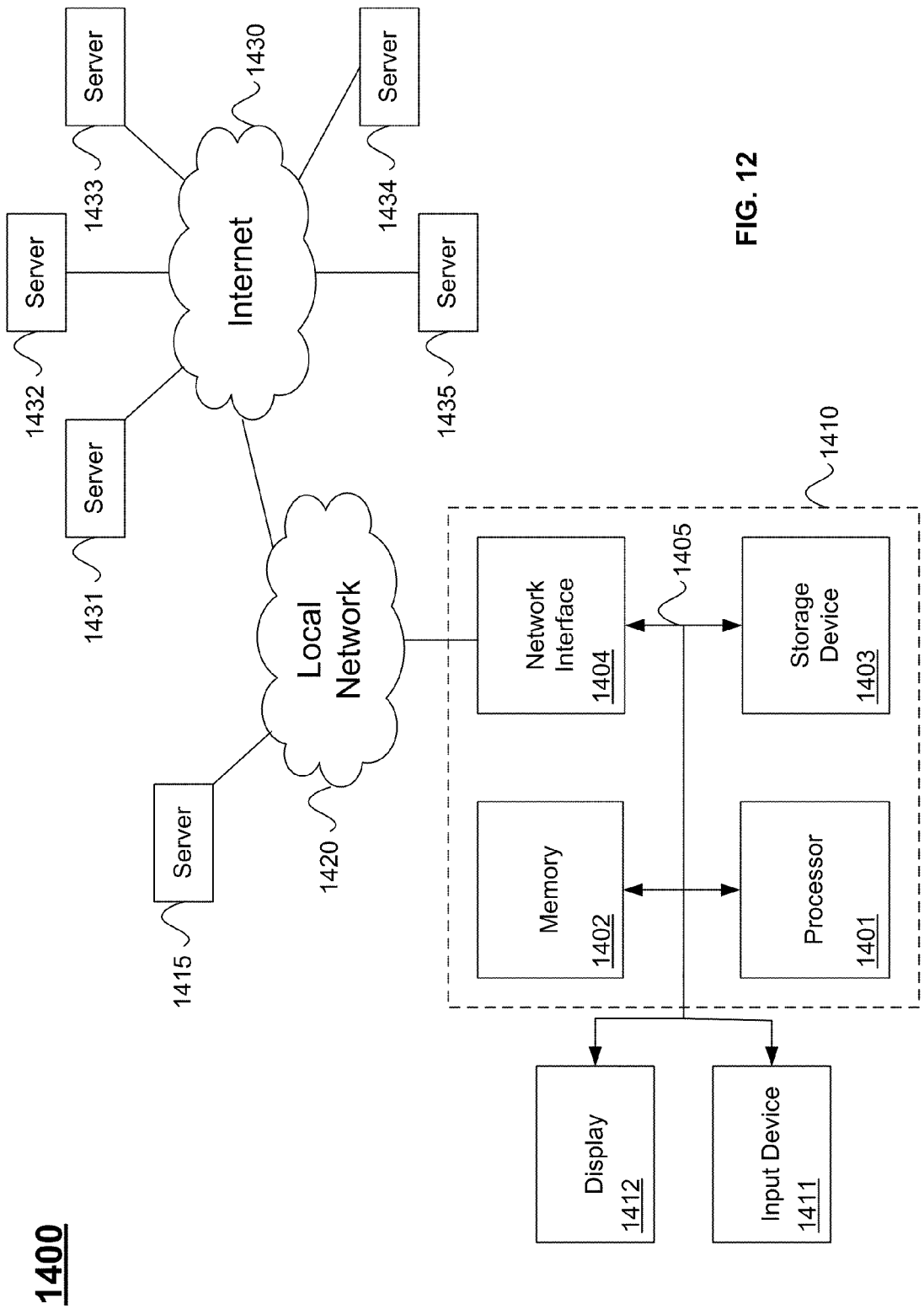
FIG. 12 is a block diagram of an example computer system and network for implementing embodiments of the present invention.

FIG. 12 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system 1400 may implement a client-server embodiment of the present invention. For example, the computer system 1410 may implement a client system that accesses the server 1431 through the Internet 1430. The computer system 1410 may implement a graphical user interface or otherwise present data to, and accept input from, a user. The server 1431 may include components similar to those of the computer system 1410. The server 1431 may store the database and may implement the database processing techniques described above. Alternatively, the server 1431 may implement the database processing techniques described above and may interface with another server that stores the database, e.g., the server 1432. The server 1431 may execute a computer program that includes a changing component and a storing component that implement the assignment changing and storing discussed above.

CONCLUSION AND OUTLOOK

The inventors estimate that enterprise systems for even larger companies (e.g. up to 100 million sales activities per year), where all business transactions, queries, including unrestricted aggregations and time-based sequences, can be answered in just a couple of seconds (including the surprisingly costly presentation layer). They expect that the impact on management of companies will be huge, probably like the impact of Internet search engines on all of us. Information will finally be at your fingertips [B. Gates. Information At Your Fingertips. Keynote address, Fall/COMDEX, Las Vegas, Nev., November 1994] without any restriction.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented online transaction processing method for dynamically and horizontally partitioning a table of a relational database, wherein the method comprises the steps of:
   providing a computer system comprising the relational database, the table of the relational database being of a column-store type and including:
      a main store, wherein the main store is organized as a column-store and horizontally partitioned into a plurality of partitions, and
      a delta store, wherein the delta store is organized as a column-store, wherein the delta store handles updates and inserts as an append operation, and wherein the delta store receives all inserts;
   inserting a first record into the table by appending it to the delta store;
   merging the delta store into the main store to store the first record in a first partition of the main store;
   changing an assignment of the first record from a first state to a second state, wherein the first state is mapped to the first partition, and the second state is mapped to a second partition of the main store, wherein changing the assignment of the first record relates to the first record transitioning through states of a dedicated lifecycle;
   storing the first record in the second partition and removing the first record from the first partition; and
   updating the first record in the main store by inserting a second record to the delta store and marking the first record as not valid,
   wherein the table further comprises attributes,
   wherein the attributes comprise at least one state attribute, wherein the at least one state attribute correspond to the states of the dedicated lifecycle,
   wherein each record comprises attribute values bijectively corresponding to the attributes,
   wherein each record comprises at least one state attribute value bijectively corresponding to the at least one state attribute, and
   wherein a state of a record depends on the at least one state attribute value.

2. The method according to claim 1,
   wherein the step of storing the first record in the second partition occurs asynchronously to the step of changing the assignment of the first record from the first state to the second state.

3. The method according to claim 1,
   wherein the table has a plurality of records including the first record and the second record, wherein the plurality of records are only changed by an insert-only approach.

4. The method according to claim 1,
   wherein the table is stored using column storage, and
   wherein each column containing the at least one state attribute is stored uncompressed.

5. The method according to claim 1, wherein the step of changing an assignment is performed by updating a state attribute value of the first record, which includes:
   inserting a new version of the first record, and
   updating the last-valid version of the first record as no longer valid.

6. The method according to claim 1, wherein the step of changing an assignment is performed by updating a state attribute value of the first record in-place, wherein the column containing the state attribute is stored uncompressed.

7. A computer system for online transaction processing, wherein the computer system implements a computer program for dynamically and horizontally partitioning a table of a relational database, wherein the computer system comprises:
   a memory; and
   a processor,
   wherein the memory stores the relational database, the table of the relational database being of a column-store type and including:
      a main store, wherein the main store is organized as a column-store and horizontally partitioned into a plurality of partitions, and
      a delta store, wherein the delta store is organized as a column-store, wherein the delta store handles updates and inserts as an append operation, and wherein the delta store receives all inserts,
   wherein the computer program is executed by the processor to implement the following steps:
      inserting a first record into the table by appending it to the delta store,
      merging the delta store into the main store to store the first record in a first partition of the main store,
      changing an assignment of the first record from a first state to a second state, wherein the first state is mapped to the first partition, and the second state is mapped to a second partition of the main store, wherein changing the assignment of the first record relates to the first record transitioning through states of a dedicated lifecycle,
      storing the first record in the second partition and removing the first record from the first partition, and
      updating the first record in the main store by inserting a second record to the delta store and marking the first record as not valid,
   wherein the table further comprises attributes,
   wherein the attributes comprise at least one state attribute, wherein the at least one state attribute correspond to the states of the dedicated lifecycle,
   wherein each record comprises attribute values bijectively corresponding to the attributes,
   wherein each record comprises at least one state attribute value bijectively corresponding to the at least one state attribute, and
   wherein a state of a record depends on the at least one state attribute value.

8. The computer system of claim 7, wherein the step of storing the first record in the second partition occurs asynchronously to the step of changing the assignment of the first record from the first state to the second state.

9. The computer system of claim 7, wherein the table has a plurality of records including the first record and the second record, wherein the plurality of records are only changed by an insert-only approach.

10. The computer system of claim 7, wherein the table is stored using column storage, and
   wherein each column containing the at least one state attribute is stored uncompressed.

11. The system according to claim 7, wherein the step of changing an assignment is performed by updating a state attribute value of the first record, which includes:
   inserting a new version of the first record, and
   updating the last-valid version of the first record as no longer valid.

12. The system according to claim 7, wherein the step of changing an assignment is performed by updating a state attribute value of the first record in-place, wherein the column containing the state attribute is stored uncompressed.

13. A non-transitory computer-readable medium, wherein the non-transitory computer-readable medium stores a computer program for controlling a computer system for online transaction processing for dynamically and horizontally partitioning a table of a relational database, the computer system including a memory and a processor, the computer program controlling the computer system to execute processing comprising:
   implementing the relational database, the table of the relational database being of a column-store type and including:
      a main store, wherein the main store is organized as a column-store and horizontally partitioned into a plurality of partitions, and
      a delta store, wherein the delta store is organized as a column-store, wherein the delta store handles updates and inserts as an append operation, and wherein the delta store receives all inserts;
   inserting a first record into the table by appending it to the delta store;
   merging the delta store into the main store to store the first record in a first partition of the main store;
   changing an assignment of the first record from a first state to a second state, wherein the first state is mapped to the first partition, and the second state is mapped to a second partition of the main store, wherein changing the assignment of the first record relates to the first record transitioning through states of a dedicated lifecycle;
   storing the first record in the second partition and removing the first record from the first partition; and
   updating the first record in the main store by inserting a second record to the delta store and marking the first record as not valid,
   wherein the table further comprises attributes,
   wherein the attributes comprise at least one state attribute, wherein the at least one state attribute correspond to the states of the dedicated lifecycle,
   wherein each record comprises attribute values bijectively corresponding to the attributes,
   wherein each record comprises at least one state attribute value bijectively corresponding to the at least one state attribute, and
   wherein a state of a record depends on the at least one state attribute value.

14. The non-transitory computer-readable medium of claim 13, wherein the step of storing the first record in the second partition occurs asynchronously to the step of changing the assignment of the first record from the first state to the second state.

15. The non-transitory computer-readable medium of claim 13, wherein the table has a plurality of records including the first record and the second record, wherein the plurality of records are only changed by an insert-only approach.

16. The non-transitory computer-readable medium of claim 13, wherein the table is stored using column storage, and
   wherein each column containing the at least one state attribute is stored uncompressed.

17. The non-transitory computer-readable medium of claim 13, wherein the step of changing an assignment is performed by updating a state attribute value of the first record, which includes:
   inserting a new version of the first record, and
   updating the last-valid version of the first record as no longer valid.

18. The non-transitory computer-readable medium of claim 13, wherein the step of changing an assignment is performed by updating a state attribute value of the first record in-place, wherein the column containing the state attribute is stored uncompressed.

* * * * *